United States Patent
Singh et al.

(10) Patent No.: US 9,913,102 B2
(45) Date of Patent: Mar. 6, 2018

(54) OPERATING UNMANNED AERIAL VEHICLES TO MAINTAIN OR CREATE WIRELESS NETWORKS

(71) Applicant: CISCO TECHNOLOGY, INC., San Jose, CA (US)

(72) Inventors: Baljit Singh, Cumming, GA (US); Om Prakash Suthar, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/205,792

(22) Filed: Jul. 8, 2016

(65) Prior Publication Data

US 2017/0013413 A1   Jan. 12, 2017

Related U.S. Application Data

(60) Provisional application No. 62/191,080, filed on Jul. 10, 2015.

(51) Int. Cl.
*H04W 24/00* (2009.01)
*H04W 4/04* (2009.01)
(Continued)

(52) U.S. Cl.
CPC .......... *H04W 4/04* (2013.01); *H04B 7/18506* (2013.01); *H04L 43/16* (2013.01);
(Continued)

(58) Field of Classification Search
USPC ...................................... 455/456; 1/1; 701/3
See application file for complete search history.

(56) References Cited

U.S. PATENT DOCUMENTS 6,141,565 A   10/2000   Feuerstein et al.
7,415,313 B2   8/2008   Brueckner et al.
(Continued)

FOREIGN PATENT DOCUMENTS

EP   2290491 A2   3/2011
WO   2015031228 A1   3/2015

OTHER PUBLICATIONS

Nokia Networks, du first in UAE to use telco drones for better network planning & faster optimization, Jul. 7, 2015, retrieved Sep. 10, 2015, 5 pages, Nokia Solutions and Networks, <http://networks.nokia.com/news-events/press-room/press-releases/no kia-networks-d u-first-i n-uae-to-use-telco-drones-for -better -network-planning-faster - ppti>.

(Continued)

*Primary Examiner* — David Q Nguyen
(74) *Attorney, Agent, or Firm* — Patterson + Sheridan, LLP

(57) ABSTRACT

Embodiments herein use a real-time system to conduct a line of sight (LOS) survey between radio sites. The system includes a drone controlled by a UAV LOS System (ULS) server to gather information regarding the LOS path between the radio sites. In one embodiment, the ULS server instructs the UAV to travel a LOS path between a first location and a second location, and determine a Fresnel radius at one or more defined locations along the LOS path between the first location and the second location. The ULS server determines a Fresnel zone between the first location and second location based in part on the determined Fresnel radius for each of the defined locations along the LOS path. The ULS server evaluates the Fresnel zone to determine if the LOS path can support a LOS wireless communication link.

18 Claims, 8 Drawing Sheets

(51) Int. Cl.
| | |
|---|---|
| *H04W 24/02* | (2009.01) |
| *H04B 7/185* | (2006.01) |
| *H04W 24/08* | (2009.01) |
| *H04W 4/02* | (2018.01) |
| *H04W 28/02* | (2009.01) |
| *H04L 12/26* | (2006.01) |
| *H04W 72/04* | (2009.01) |
| *H04W 24/10* | (2009.01) |
| *H04W 84/18* | (2009.01) |

(52) U.S. Cl.
CPC .............. *H04W 4/02* (2013.01); *H04W 24/02* (2013.01); *H04W 24/08* (2013.01); *H04W 28/0289* (2013.01); *H04W 72/048* (2013.01); *H04W 24/10* (2013.01); *H04W 84/18* (2013.01)

(56) References Cited

U.S. PATENT DOCUMENTS

| | | |
|---|---|---|
| 8,989,922 B2 | 3/2015 | Jones et al. |
| 9,363,690 B1 | 6/2016 | Singh et al. |
| 2012/0106356 A1 | 5/2012 | Johansson et al. |
| 2015/0078344 A1 | 3/2015 | Futaki et al. |
| 2015/0140954 A1 | 5/2015 | Maier et al. |
| 2015/0236778 A1 | 8/2015 | Jalali |
| 2015/0312774 A1 | 10/2015 | Lau |
| 2015/0353195 A1 | 12/2015 | Peeters et al. |
| 2015/0356482 A1 | 12/2015 | Whipple et al. |
| 2016/0040902 A1 | 2/2016 | Shah |
| 2016/0117932 A1* | 4/2016 | Park .................. G01S 19/39 701/3 |
| 2016/0300492 A1* | 10/2016 | Pasko ................. G08G 5/0091 |

OTHER PUBLICATIONS

Brown, Mark, Kinect-carrying drone automatically builds 3D maps of rooms, WIRED.CO.UK, Mar. 31, 2011, 3 pages, <http:/fwww.wired.co.ukfnews/archive/2011-03/31/kinect-drone>.

Smith, Brett, Drones Help Create Detailed Maps of Coral Reefs, redOrbit: Your Universe Online, Oct. 16, 2013, 3 pages, <http:/fwww.redorbit.com/news/science/111297671 Of drones-help-create-detailed-maps-of-coral-reefs/ >.

Turk, Victoria, Drones Mapped the Philippines to Improve Typhoon Aid Efforts, Motherboard, May 9, 2014, 10 pages, <http :/fmotherboard. vice .com/read/drones-mapped-the-phi li ppines-to-improve-typhoon-a id-efforts>.

Intel and Cisco: Collaborative Testing of a Media-Ready WLAN Solution: Executive Summary, White Paper, pp. 1-6, 2011, Intel Corporation, Santa Clara, United States.

Churchill, Sam, UAVs: Flying Cell Towers, dailywireless.org, Nov. 19, 2012, 7 pages, <http://www.dailywireless.org/2012/11/19/uavs-flying-cell-towers/>.

Popper, Ben, Google says its Titan drones will make their first flight in a few months, THE VERGE, Mar. 2, 2015, 3 pages, <http:/www/eee.theverge.com/2015/3/2/8131145/googles-titan-drone-flight-internet-access>.

Jackson, Donny, Motorola Solutions: Alan Conrad demonstrates prototype handlheld LTE eNodeB/EPC, drone application, Urgent Communications, Apr. 23, 2015, 4 pages, <http://urgentcomm.com/motorola-solutions/motorola-solutions-alan-conrad-demonstrates-prototype-handheld-lte-enodebepc-dron>.

Jones, Dan, Here Comes the Wifi Drones, LightReading: Networking the Communictions Industry, Nov. 11, 2016, 6 pages, <http://www.lightreading.com/iot/drones/here-come-the-wifi-drones/d/d-id/706525>.

International Search Report for PCT/US2016/041805 dated Sep. 29, 2016.

* cited by examiner

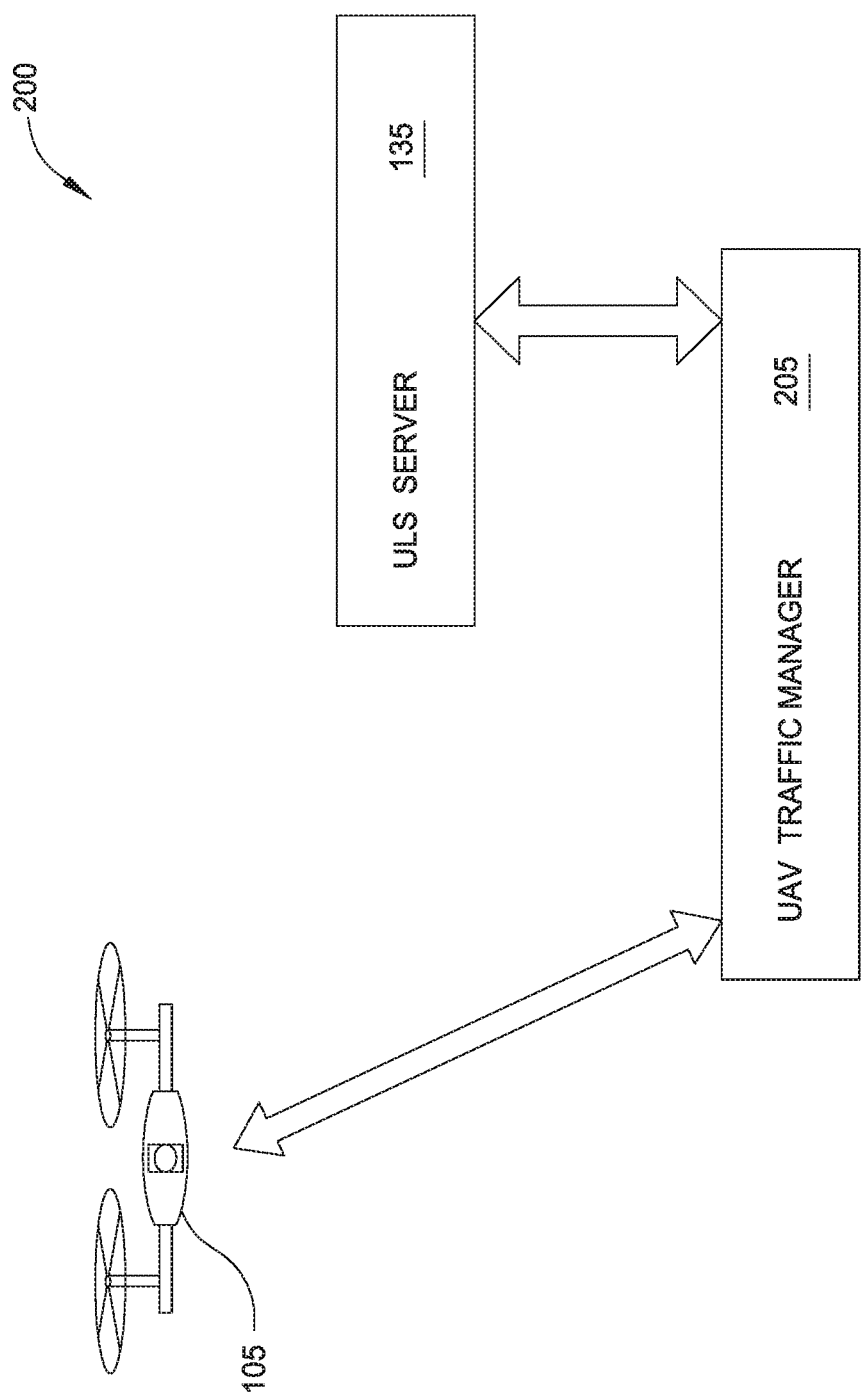

OPERATING UNMANNED AERIAL VEHICLES TO MAINTAIN OR CREATE WIRELESS NETWORKS

CROSS-REFERENCE TO RELATED APPLICATIONS

This application claims benefit of U.S. Provisional Patent Application Ser. No.: 62/191,080, filed Jul. 10, 2015, which is incorporated by reference in its entirety.

TECHNICAL FIELD

Embodiments presented in this disclosure generally relate to performing line of sight (LOS) surveys, and more specifically, to using a drone to conduct LOS surveys and test the Fresnel zone between radio sites for microwave backhaul planning.

BACKGROUND

Operators of wireless networks (e.g., cell phone providers, mobile data providers, and the like) increasingly resort to microwave backhaul solutions to keep up with increasing demand for increased capacity in existing backhaul systems. In a wireless microwave backhaul network, data traffic is transmitted between microwave antennas via one or more microwave relay links. In order to establish a radio link between any two points (e.g., two microwave antennas), a clear path or radio line of sight (LOS) must exist between the two antennas. Further, consideration must also be given to the Fresnel zone (e.g., the ellipsoidal area surrounding the LOS) between the two microwave antennas as objects that penetrate the Fresnel zone can attenuate the strength of a signal passing through the radio link.

Wireless network operators typically rely on field test engineers to physically verify that a LOS exists between two radio sites and gather data that can be used for microwave backhaul planning. For example, one or more test engineers check all critical points along the desired path for any existing (and foreseeable) obstacles (e.g., such as buildings, trees, hilltops, vehicles, building cranes, etc.) that may interfere with the LOS and/or Fresnel zone between radio sites. Some of the methods used to verify LOS and identify existing (and potential) obstacles include climbing towers and using binoculars (e.g., one field engineer on a first tower checks to see if the other field engineer on the second tower is visible), flashing the path (e.g., with a flashlight), using balloons, driving and/or walking the path, etc. Each of these methods can be inaccurate, time consuming, expensive, and logistically complex (e.g., requiring several test engineers and planning to navigate around potentially dangerous obstacles in the path, such as rivers, mountains, traffic, etc.).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 illustrates a closed-loop system for conducting a LOS survey using a drone, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
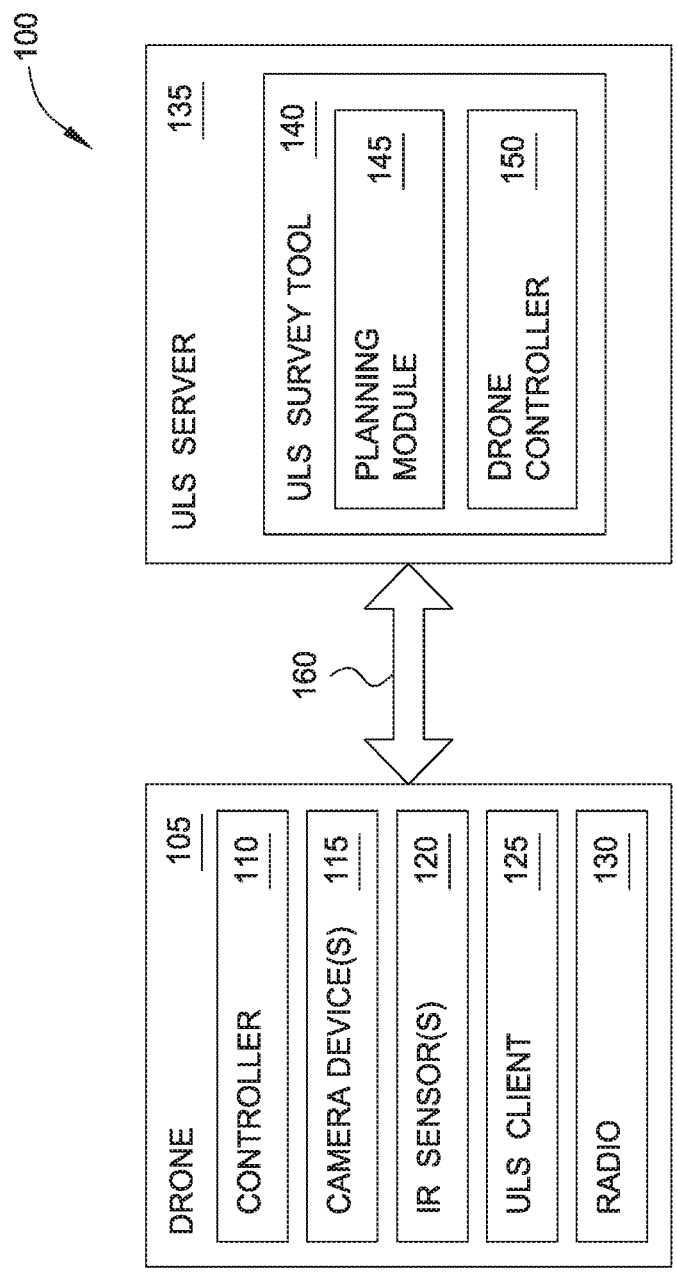
FIG. 1 is a block diagram of a system for conducting a LOS survey using a drone, according to one embodiment described herein.

One embodiment presented in this disclosure is a method that includes instructing an unmanned aerial vehicle (UAV) to travel a line of sight (LOS) path between a first location and a second location, and instructing the UAV to determine a Fresnel radius at one or more defined locations along the LOS path between the first location and the second location. The method also includes determining a Fresnel zone between the first location and second location based in part on the determined Fresnel radius for each of the defined locations along the LOS path. The method further includes evaluating the Fresnel zone to determine if the LOS path can support a LOS wireless communication link.

Another embodiment described herein is a computing system that includes at least one computing processor. The computing processor is configured to instruct a UAV to travel a LOS path between a first location and a second location, and instruct the UAV to determine a Fresnel radius at one or more defined locations along the LOS path between the first location and the second location. The computing processor is also configured to determine a Fresnel zone between the first location and second location based in part on the determined Fresnel radius for each of the defined locations along the LOS path. The computing processor is further configured to evaluate the Fresnel zone to determine if the LOS path can support a LOS wireless communication link.

Another embodiment described herein is a communication system that includes a UAV and at least one computing processor. The computing processor is configured to instruct the UAV to travel a LOS path between a first location and a second location, and instruct the UAV to determine a Fresnel radius at one or more defined locations along the LOS path between the first location and the second location. The computing processor is also configured to determine a Fresnel zone between the first location and second location based in part on the determined Fresnel radius for each of the defined locations along the LOS path. The computing processor is further configured to evaluate the Fresnel zone to determine if the LOS path can support a LOS wireless communication link.

Example Embodiments

Embodiments herein describe a system for conducting, in real-time, a survey of a LOS path between radio sites with an unmanned aerial vehicle (UAV). The system includes a UAV which is controlled by a UAV LOS System (ULS) server to gather information regarding the LOS path between radio sites. Such information, for example, can include the number and/or type of obstructions between the sites, parameters for determining one or more Fresnel zones, amount of penetration of obstacles to the Fresnel zone(s), images taken by the UAV of the obstacles, etc. In one embodiment, the ULS server configures the UAV with location parameters (e.g., longitude, latitude, height) for one or more radio sites (e.g., a source radio site and a target radio site). In one example, one or more of the radio sites can be locations with existing physical structures (e.g., communication towers, water tower mounted with antenna, building, etc.). In one example, one or more of the radio sites can be locations where a wireless network operator is considering building an physical structure (e.g., communication tower, building, etc.) to support one or more microwave antennas.

Once the ULS server configures the UAV with the location of a source and target site, the ULS server dispatches the UAV to the source radio site and instructs the drone to fly a predetermined path from the source radio site to the target radio site. In one example, the predetermined path corresponds to a proposed LOS propagation from a first height (or elevation) at the source radio site to a second height (or elevation) at the target radio site. That is, the ULS server configures the UAV to simulate the LOS propagation of a radio wave transmitted from a microwave antenna placed at the source radio site to a microwave antenna placed at the target radio site, and configures the UAV to determine if there are obstacles that will interfere with the path.

While traveling the path, the UAV uses one or more sensors (e.g., camera sensors, infrared (IR) sensors, etc.) attached to the UAV to monitor for obstacles and gather data regarding the LOS path. For example, in one embodiment, while traveling the path, the UAV determines the Fresnel radius at predefined locations along the LOS path between the source radio site and the target radio site, and uses its attached sensors to determine if there are any obstacles (or objects) around the UAV within (or that penetrate) the Fresnel radius (e.g., in a three dimensional space, such as a cylindrical coordinate system). If so, the UAV uses its camera sensor to capture an image and/or a recording of the obstacle, and uses its IR sensors to determine the amount (e.g., percentage) of penetration of the obstacle into the respective portion of each Fresnel zone at the particular location. Once the data at the particular location is gathered by the UAV, the UAV transmits the data to the ULS server. The UAV then proceeds to repeat the above process at each predefined location along the LOS path between the source and target radio sites until the UAV reaches the target radio site. In this manner, the ULS server can receive real-time information regarding the LOS path and/or Fresnel zone between two radio sites, which can be used to aid microwave backhaul planning.

Once the ULS server determines the UAV is at the target site, the ULS server generates a three-dimensional visual representation of the LOS path and Fresnel zone(s) between the source and target radio sites based in part on the information gathered from the UAV at each predefined location along the path. The ULS server evaluates the Fresnel zone(s) and determines if design parameters associated with the source and target radio sites are acceptable for establishing a microwave link. In one embodiment, for example, the ULS server can determine the proposed path for the radio link has an acceptable Fresnel zone(s) if the amount of penetration of any identified obstacles into the Fresnel zone(s) does not exceed a predetermined threshold. If the Fresnel zone is clear or if penetration into the Fresnel zone(s) is within the tolerance, the ULS server can instruct the UAV to return to base. The ULS server may then transmit the design parameters along with the three-dimensional visual representation of the LOS path and Fresnel zone(s) to a user.

In situations where the ULS server determines that the Fresnel zone(s) associated with the proposed radio path is not acceptable, the ULS server may reconfigure the UAV with an updated set of design parameters (e.g., a different height, different location, etc.) for the source and target radio sites and instruct the UAV to travel along another LOS path between the radio sites according to the updated parameters. The UAV again measures and returns the data associated with the LOS path to the ULS server. In one embodiment, the ULS server can determine the updated set of design parameters based on the previous determined Fresnel zone(s). For example, the ULS can determine the height above any identified obstacles needed to obtain a clear Fresnel zone and/or satisfy a predetermined Fresnel penetration threshold. In this manner, embodiments herein provide an automated system for conducting a real-time LOS survey and three dimensional simulation of a LOS path that can be used for RF microwave backhaul planning.

FIG. 1 is a block diagram of a system 100 for conducting a LOS survey between radio sites, according to one embodiment described herein. The system 100 includes a drone 105 and a ULS server 135. The drone 105 is an example of an unmanned aerial vehicle (UAV), which may also be referred to as an unpiloted aerial vehicle, remotely piloted aircraft (RPA), and the like. In one embodiment, the drone 105 can be controlled either by an internal controller (e.g., controller 110) or by an external system without receiving instructions from a human operator. However, in one embodiment, the drone 105 can be controlled by a human operator in the event of an emergency or if the internal and/or external controller systems fail. For example, as will be discussed in detail below, the drone 105 receives geo-location parameters (e.g., a latitude and longitude) as well as a height (or elevation) the drone should hover for one or more radio sites. In another example, the drone 105 can receive a predetermined path (e.g., to one or more of the radio sites) to travel from the ULS server 135. While traveling to the given coordinates and/or along the predetermined path, if a human operator observing the drone 105 determines the drone 105 is about to collide with an object or is behaving erratically, the human operator may override the controller 110 and safely navigate the drone 105. Thus, the embodiments herein do not require that the drone 105 always be operated without any human control.

In addition to the controller 110, the drone 105 includes one or more camera devices 115, one or more IR sensors 120, ULS client 125, and radio 130. In one embodiment, the IR sensors 120 enable the drone 105 to detect obstacles that may be in the LOS path and/or within one or more Fresnel radius at each distance interval (or location) along the LOS path between a source and target site. That is, while traveling the LOS path, at each interval, the drone 105 can configure the IR sensors 120 to scan at the Fresnel radius corresponding to the distance interval. For example, if the drone 105 determines that the Fresnel radius at the midpoint distance between a source and target site is a hundred feet, the drone 105 uses the IR sensors 120 to scan at a hundred feet at the midpoint distance for any obstacles. In this manner, the drone 105 can detect if an object is within the Fresnel radius at any given interval and determine how much (or the degree to which) the object protrudes into the Fresnel radius.

The camera devices 115 enable the drone 105 to capture one or more images of obstacles detected by the IR sensors 120 at any given distance interval. Additionally, or alternatively, the drone 105 can use the camera devices 115 to take a video (or recording) of the detected obstacle. In this manner, the drone 105 can gather additional information regarding the obstacle (e.g., such as type, size, etc.) that can be used for planning a microwave link. In some embodiments, the drone 105 can use the camera devices 115 to also scan for objects within the Fresnel radius.

The ULS client 125 facilitates communication between the drone 105 and the ULS survey tool 140 and is configured to gather interference and obstruction information regarding the LOS path between a source and target site. In one embodiment, the ULS client 125 may receive a set of parameters from the ULS survey tool 140 that are used to move the drone 105 to a desired location (e.g., a source radio site) and configure the drone 105 to conduct a LOS survey between source and target sites. For example, such parameters can include coordinates (e.g., latitude, longitude) of proposed locations for one or more radio sites, three dimensional topographical map data, information regarding physical structures (e.g., existing towers, obstructions, and other terrain information), average height above ground level (AGL) to maintain, distance intervals (e.g., for determining Fresnel radius), frequency of proposed wireless link, etc.

Using the parameters, the ULS client 125 configures the controller 110, IR sensors 120, and radio 130 to conduct the LOS survey. For example, using the parameters, the ULS client 125 can determine one or more Fresnel radiuses at the predetermined distance intervals between two radio sites with the following Equation (1):

$$FR_n = \sqrt{\frac{n\lambda d_1 d_2}{d_1 + d_2}} \quad (1)$$

where $FR_n$ is the $n^{th}$ Fresnel Zone radius, $d_1$ is the distance from the source radio site to the respective interval, $d_2$ is the distance from the respective interval to the target radio site, and $\lambda$ is the wavelength of the signal to be transmitted in the proposed link. Once determined, the ULS client 125 can then collect information regarding obstacles detected in the LOS path and/or $n^{th}$ Fresnel zone (e.g., using IR sensors 120 and camera devices 115) and use radio 130 (e.g., which may include a transmitter and receiver) to send the information to the ULS survey tool 140 in real-time as the drone 105 travels the LOS path between a source and target radio site. The ULS client 125 and the controller 110 may be software, hardware, or combinations thereof.

The ULS server 135 (e.g., a computing system with one or more processors) includes the ULS survey tool 140, which may include software, hardware, or combinations thereof for automatically controlling the drone AP 105 (i.e., without user input). Moreover, although FIG. 1 illustrates a ULS survey tool located on server 135, the ULS survey tool 140 may be distributed across multiple servers 135 or computing devices. For example, the ULS survey tool 140 can be executed in a data center or cloud environment where multiple computing nodes are used to execute the functions described herein.

The ULS survey tool 140 includes a planning module 145, which is generally configured to automatically validate information regarding the LOS path gathered by the drone 105 as the drone 105 travels the LOS path between radio sites. In one embodiment, the planning module 145 is configured to determine the Fresnel zone(s) between the radio sites based on the Fresnel zone radius information and obstruction information received from the drone 105, and generate a visual representation of the LOS path and Fresnel zone(s) between the sites. In one embodiment, the planning module 145 can automatically adjust one or more parameters that the drone 105 uses to conduct the LOS survey between sites. For example, in some cases, the planning module 145 may determine from processing the information received from the drone 105 that the LOS path between the sites is blocked or that the percentage of penetration of an obstacle into the Fresnel zone(s) is above a predetermined threshold. In such cases, the planning module 145 can adjust the set of parameters for the drone 105 to use in order to increase the likelihood of obtaining a successful LOS survey. To do so, the planning module 145 processes the obstruction and Fresnel zone information received from the drone 105 using one or more optimization algorithms to determine, for example, an adjusted height above each site, different location, adjusted frequency, etc., needed to achieve Fresnel zone clearance (or a Fresnel zone with obstructions within a predetermined threshold).

Once the planning module 145 determines an updated set of parameters, the planning module 145 instructs the drone 105 to conduct another LOS survey according to the updated set of parameters. In one example, if the updated set of parameters includes an adjusted height for the source site, the planning module 145 can instruct (via drone controller 150) the drone 105 to conduct the LOS survey from the source site at the adjusted height. In one example, if the updated set of parameters includes a different proposed location for either the source or target site, the planning module 145 can dispatch (via drone controller 150) the drone 105 to the different location.

Conversely, in examples where the planning module 145 determines from processing the information received from the drone 105 that the Fresnel zone is acceptable, the planning module 145 can instruct the drone 105 to proceed to a different source site in order to perform a subsequent LOS path survey for another proposed radio link, or instruct the drone 105 to return to home base. In this manner, the planning module 145 can automatically validate in real-time information about radio link paths that can be used for microwave backhaul planning.

In addition to these functions, the ULS survey tool 140 controls the path traveled by the drone 105 as the drone travels to its deployment location (e.g., source site) to conduct a LOS survey. To do so, the ULS survey tool 140 includes the drone controller 150 which generates and maintains the path traveled by the drone 105. The drone controller 150 may consider obstacles in the region such as man-made structures, road conditions, trees, topography, and the like when selecting a path of the drone 105 to the source site. Moreover, the drone controller 150 may indicate an altitude or height that the drone 105 should fly when traveling the path.

In addition to providing the path, the drone controller 150 may receive updates from the controller 110 on the drone

105 to determine if the drone 105 is following the path. If not, the drone controller 150 can send updated information to move the drone 105 into the desired location. As shown, the drone 105 and ULS server 135 are communicatively coupled by wireless link 160.

FIG. 2 illustrates a closed-loop system 200 for conducting and validating a LOS survey of a LOS path using the drone 105, according to one embodiment described herein. The system 200 includes the drone 105, UAV traffic manager (UTM) 205, and ULS server 135. In this example, the drone 105 is a UAV that may include one or more propellers for directing the flight path of the drone 105. Although not shown here, the drone 105 may include the controller 110 (e.g., a flight controller), camera device(s) 115, IR sensor(s) 120, ULS client 125, and the radio 130 as illustrated in FIG. 1. Moreover, although FIG. 2 illustrates a UTM that is separate from the ULS server 135, in some embodiments, the UTM 205 may be integrated with the ULS server 135. The UTM 205 may be software, hardware, or combinations thereof.

The UTM 205 serves as an intermediary between the ULS client 125 on the drone 105 and the ULS server 135. That is, the UTM 205 routes Fresnel zone radius information, interference and obstruction information, images/videos of obstructions, and the like, collected by the drone 105 (traveling a LOS path between sites) to the ULS server 135 using a wireless connection. The UTM 205 also provides flight path information and configuration information generated by the ULS server 135 for conducting the LOS survey to the drone 105. In addition, the UTM 205 may aid the drone 105 in other tasks such as obstacle avoidance, weather conditions, monitoring internal systems, and the like.

For example, the UTM 205, controller 110 and/or drone controller 150 can monitor the internal systems of the drone 105 to determine if these systems are functioning properly and to ensure safe operation. In cases where the drone's energy source is running low, the drone is experiencing mechanical issues (e.g., with a propeller), the drone is in (or near) unsafe weather conditions, etc., the UTM 205, controller 110 and/or drone controller 150 may move the drone 105 to a safe location.

Figure 3A:
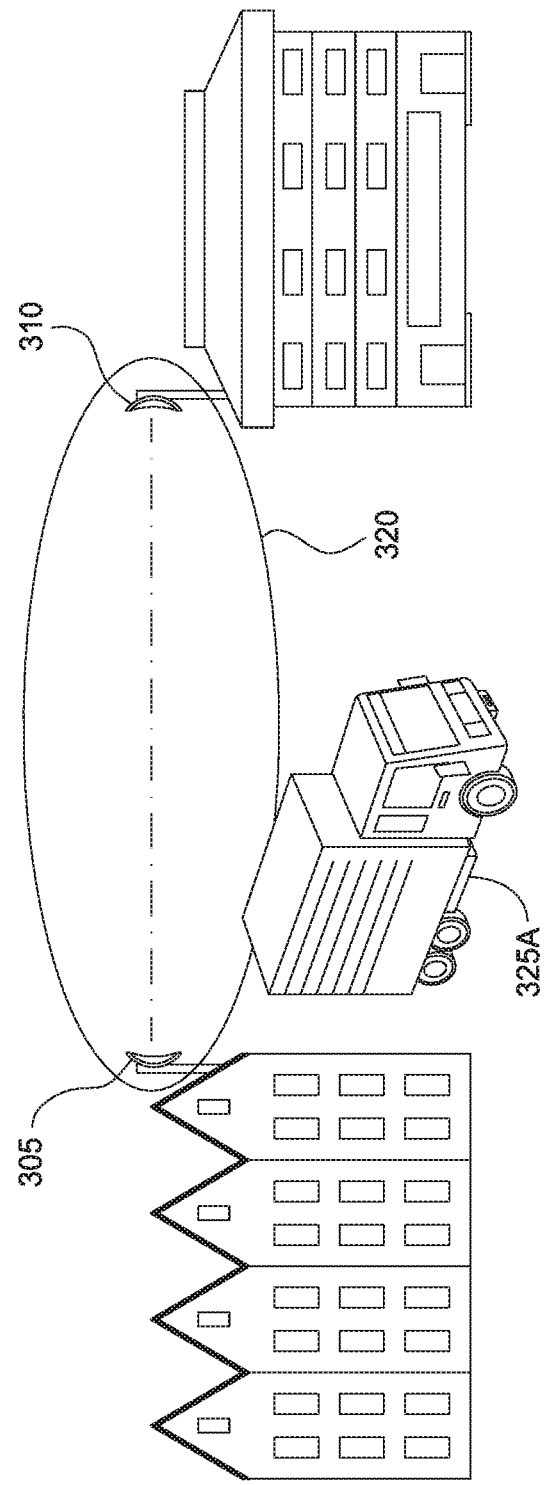
FIGS. 3A-3C illustrate examples of obstacles penetrating a Fresnel zone that can be detected via a LOS survey conducted with a drone, according to embodiments described herein.
Figure 3B:
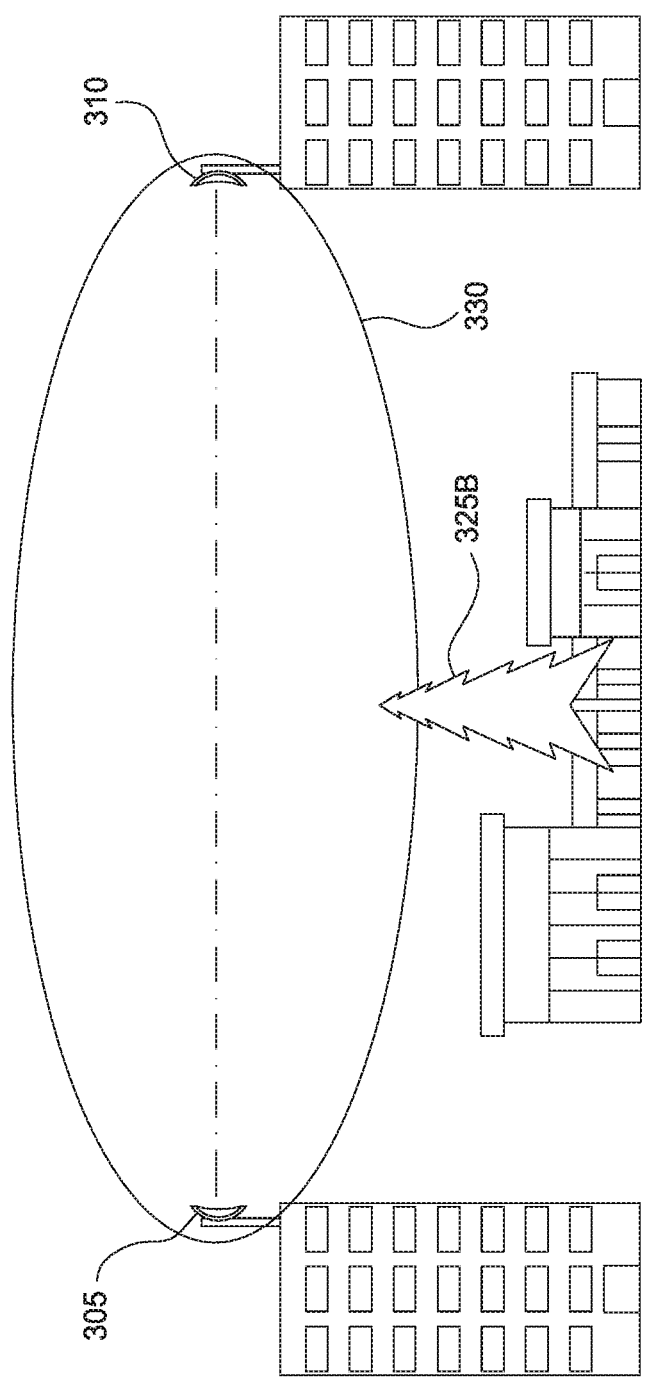
Figure 3C:
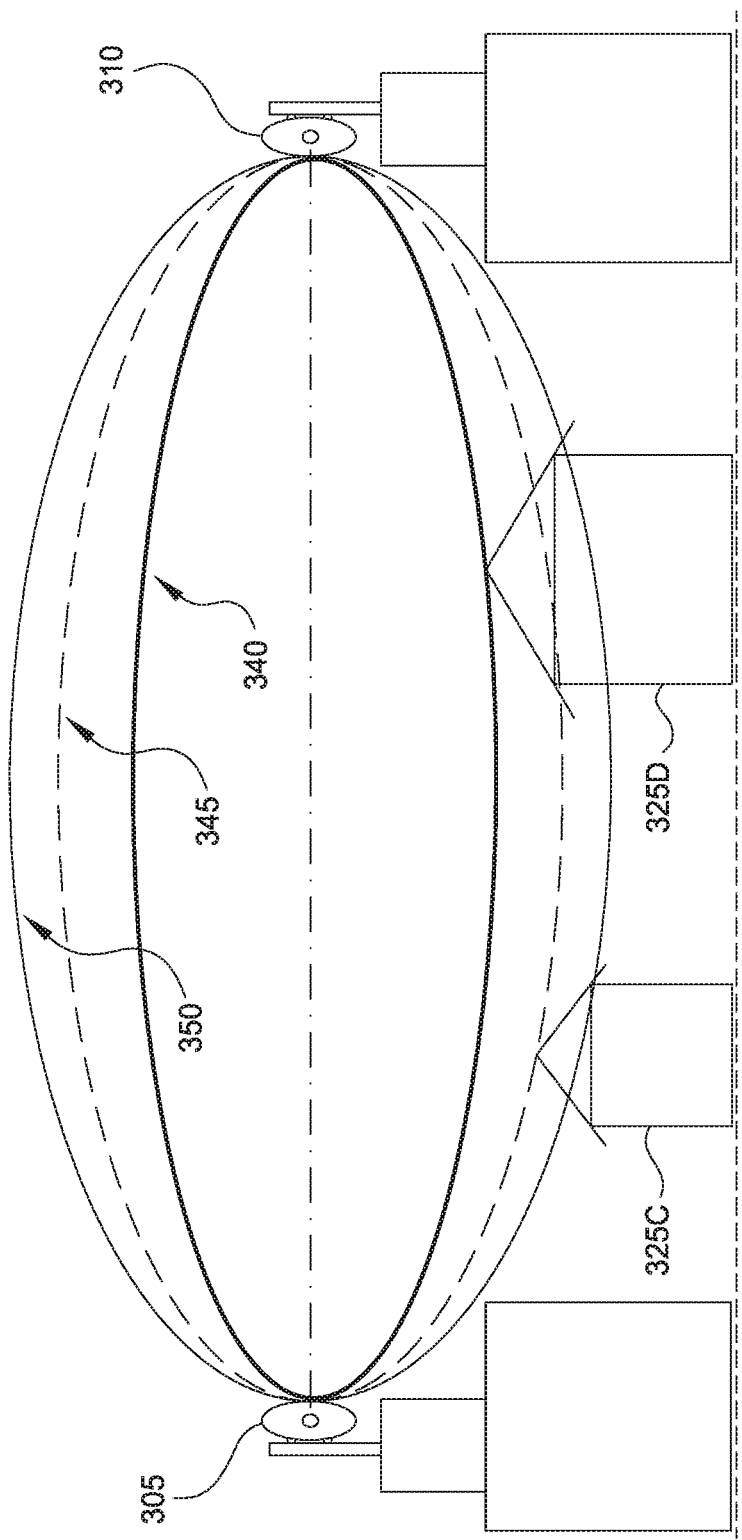

FIGS. 3A-3C illustrate different examples of obstacles penetrating a Fresnel zone between a source and target site that can be automatically detected in real-time using the drone 105, according to embodiments described herein. As noted above, in order to establish a successful microwave link between two points, a LOS must exist between the two points. In addition to a LOS, a significant portion (or all) of the Fresnel zone, which generally refers to the ellipsoidal area that surrounds the LOS propagation path between two antennas, should be free of obstacles in order to achieve full capacity for the microwave link. In general, the amount of allowed penetration into the Fresnel zone(s) may depend on the performance requirements of the link between two sites.

FIG. 3A, for example, shows one scenario where a LOS exists between source antenna 305 and target antenna 310, but the Fresnel zone 320 is penetrated by an obstacle 325A (e.g., a vehicle). FIG. 3B shows another scenario where a LOS exists between antennas 305, 310, but the Fresnel zone 330 is penetrated by an obstacle 325B (e.g., a tree). FIG. 3C shows a scenario where a LOS exists between antennas 305, 310 and a first Fresnel zone 340 is clear of obstacles. However, in this example, a second Fresnel zone 345 is penetrated by obstacle 325D, and a third Fresnel zone 350 is penetrated by obstacles 325C and 325D.

As described in more detail below, for each of the scenarios depicted in FIGS. 3A-3C, the ULS survey tool 140 (using the drone 105) can automatically detect the obstacles 325A-D and determine in real-time if the respective Fresnel zones 320, 330, 340, 345 and 350 are sufficient for establishing a microwave link. As such, the techniques presented herein provide improved techniques (e.g., compared to traditional techniques) for conducing LOS path surveys for backhaul planning. Moreover, although FIGS. 3A-3C illustrate antennas that are located on existing structures, note that the techniques herein can also be applied to locations that do not yet have existing physical structures to support an antenna. Further, although FIGS. 3A-3C illustrate a LOS path that is horizontal (e.g., 90 degrees), note that the techniques presented herein can be applied to wireless links at other inclinations. Stated differently, an antenna located at a source site may be at the same or different height as an antenna located at a target site.

Additionally, or alternatively, in some embodiments, the techniques presented herein can be used for system maintenance. For example, assume that two radio sites are transmitting data via a LOS path. In such an example, embodiments herein can conduct a survey of the existing LOS path to determine if the Fresnel zone has been violated (e.g., due to tree growth, new construction, etc.). In this manner, the techniques presented herein provide an efficient way to perform maintenance for an existing wireless network.

Figure 4:
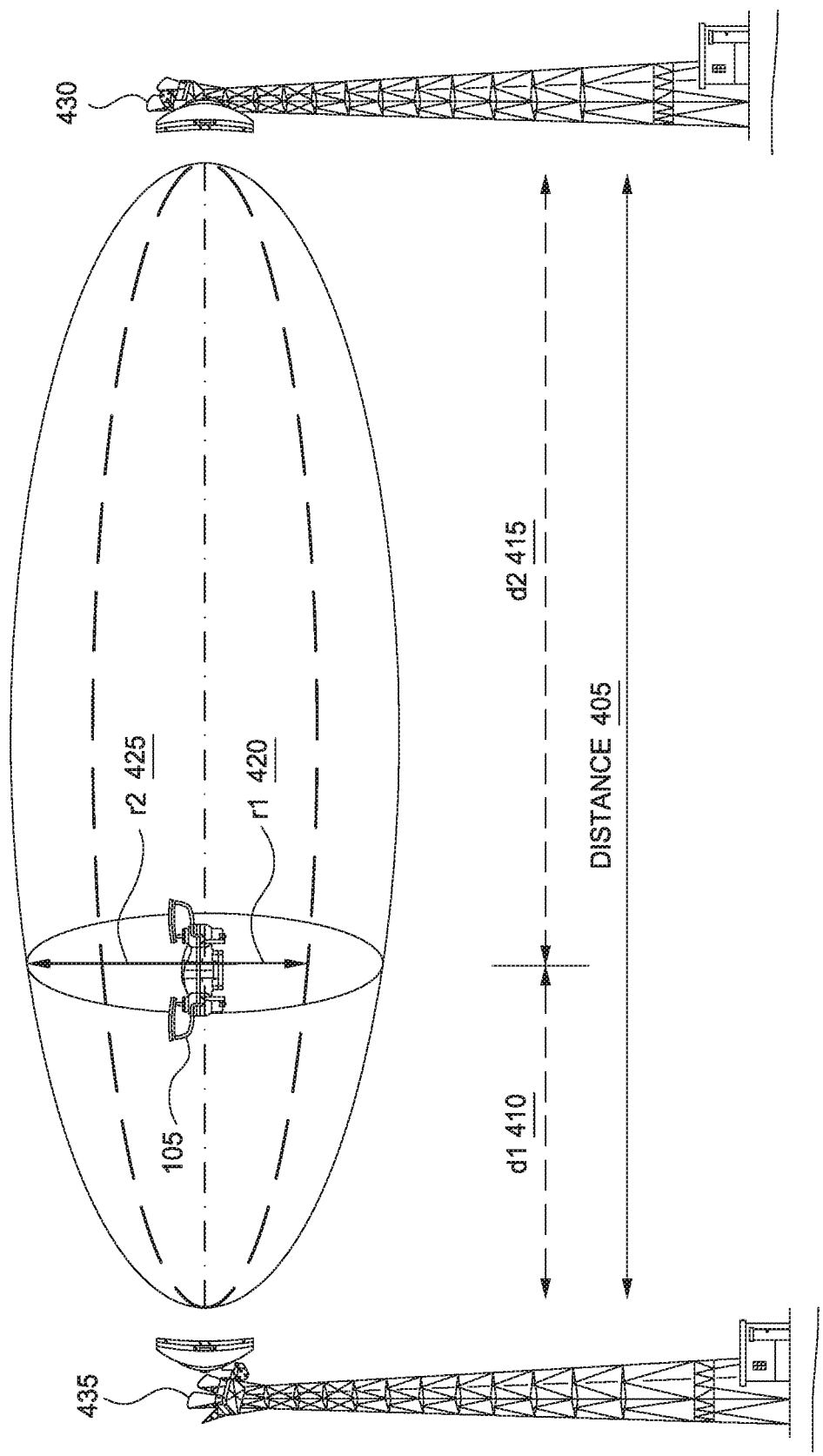
FIG. 4 illustrates an example of using a drone to conduct a LOS survey between two radio sites, according to one embodiment described herein.

FIG. 4 illustrates one example of using a drone 105 to conduct a LOS path survey between two radio sites in real-time, according to one embodiment described herein. In this example, a ULS survey tool 140 may use the planning module 145 to dispatch the drone 105 to a first site location 435 at a specified height (above the first location 435). Once the ULS survey tool 140 determines the drone 105 has reached the first site location 435 and specified height, the ULS survey tool 140 instructs the drone 105 to travel a LOS path from the first site location 435 and specified height to the second site location 430 and second specified height (above the second location 430). Although FIG. 4 depicts existing physical structures at locations 435 and 430, in some embodiments there may not be physical structures at locations 435 and 430. Thus, in these embodiments, the drone 105 can be configured to conduct a LOS survey of a proposed LOS path between two communication antennas in order to determine if the two locations are suitable for the establishment of a microwave link.

While the drone 105 travels the LOS path from location 435 to location 430, the drone 105 at predefined intervals (or locations) along distance 405 is configured to determine a portion of the Fresnel zone at the respective interval (e.g., using Equation (1)). For example, as shown in FIG. 4, after a first distance 410, the drone 105 determines a first Fresnel radius 420 (e.g., using Equation (1) with n=1, d1=first distance 410, and d2=second distance 415) and a second Fresnel radius 425 (e.g., using Equation (1) with n=2, d1=first distance 410, and d2=second distance 415). Once determined, the drone 105 uses IR sensors 120 to scan for obstacles at or within each of the first and second Fresnel radiuses 420, 425.

If the drone 105 detects obstacles, the drone 105 determines the amount (e.g., percentage) of penetration of the obstacle into each of the Fresnel zones at the respective interval. For example, assume the first Fresnel radius is 10 meters and the second Fresnel radius is 20 meters. In such an example, if the drone 105 detects an obstacle that is 5 meters away (from the LOS path), the drone 105 determines that the obstacle penetrates 50% into the first Fresnel zone and 75% into the second Fresnel zone at the given interval.

Once detected, the drone 105 can use camera devices 115 to photograph and/or record the detected obstacle. The drone 105 transmits the Fresnel radius, and obstacle and interference information to the ULS survey tool 140. The drone 105 then repeats the above process of scanning for obstacles based on the Fresnel radius at each interval along distance 405 until the drone 105 reaches the second location 430. In this manner, embodiments herein can gather information regarding a LOS path in real-time using a drone for microwave backhaul planning.

In some embodiments, once the drone 105 reaches the second location 430, the ULS survey tool 140 can generate a three dimensional representation of the cylindrical Fresnel zones between locations 435 and 430 based on the Fresnel radius information and obstruction information received from the drone 105 at each interval. In one embodiment, the ULS survey tool 140 determines if the LOS path and generated Fresnel zones are suitable (e.g., subject to one or more design criteria, such as allowed penetration threshold, link capacity requirements, desired frequency for the link, foreseeability of future obstructions that may affect the Fresnel zone, etc.). If not, the ULS survey tool 140 can reconfigure one or more of the parameters and instruct the drone 105 to conduct another LOS survey of the LOS path with the adjusted parameters. Continuing with the above example, the ULS survey tool 140 may determine an increased height (above either the first or second locations) that is needed to achieve full clearance (or some other percentage clearance) for the first and second Fresnel zones. In this manner, the ULS survey tool 140 can evaluate information (gathered by the drone 105) regarding a LOS path in real-time to determine if the proposed site locations can support a microwave radio link.

Figure 5:
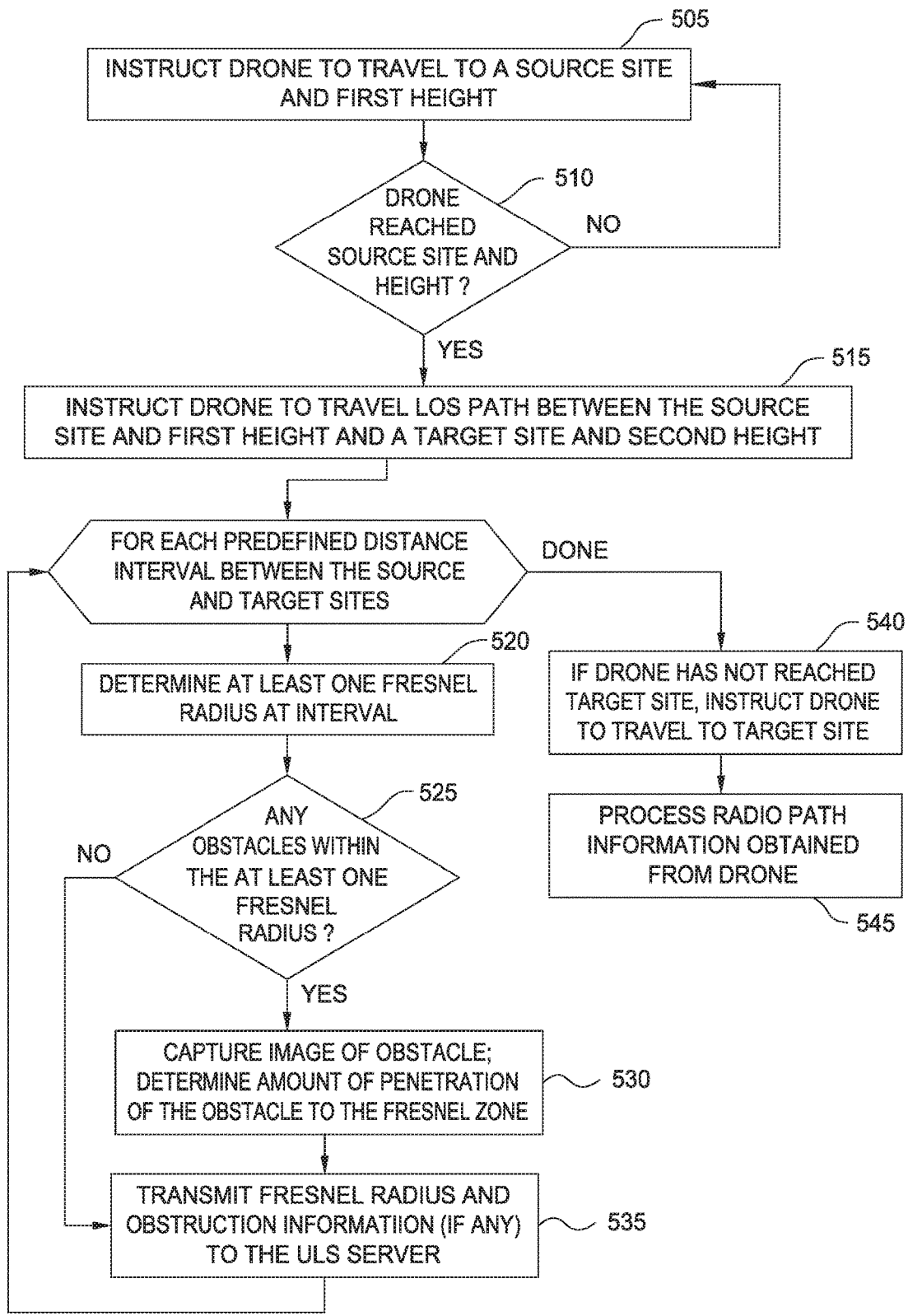
FIG. 5 is a flow chart for conducting a LOS survey using a drone, according to one embodiment described herein.

FIG. 5 is a flowchart illustrating a method 500 for conducting a LOS survey of a LOS path between two radio sites using a drone, according to one embodiment described herein. At bock 505, the ULS survey tool (in the ULS server) instructs a drone (or UAV) to travel to a source site location (e.g., a latitude and longitude) and specified height (above the source site location). As noted above, the ULS survey tool can configure the drone with other parameters, such as three dimensional topographical map data, design parameters of existing man-made structures, etc.

At block 510, the ULS survey tool determines if the drone has reached the source site and specified height. If not, the ULS survey tool can use the drone controller (e.g., drone controller 150) or the UTM to generate a path for the drone to fly to reach the coordinates of the source site. The drone controller may consider such things as buildings, terrain, power lines, trees, densely populated areas, and the like to generate a flight path between the home base of the drone and the coordinates. The drone controller may provide continuously flight information to the flight controller in the drone in order to guide the drone to the desired coordinates or upload the flight path to the drone and permit the internal flight controller to guide the drone to the coordinates.

Once the ULS survey tool determines the drone has reached the source site and specified height, the ULS survey tool instructs the drone to travel a path corresponding to the LOS between the source site and first height and a target site and second height (above the target site) (block 515). Once instructed, the drone proceeds to travel the LOS path. In one embodiment, the UTM or the drone controller in the ULS Survey tool may constantly monitor the positions of the drone to ensure the drone travels along the desired flight path.

While the drone travels the path, for each predefined distance interval between the source and target sites, the drone determines at least one Fresnel radius at the interval (block 520) (e.g., using Equation (1)). At block 525, the drone determines if there are any obstacles within the at least one Fresnel radius determined for the interval. As noted above, to do so, the ULS client in the drone can configure the IR sensors to scan at a distance specified by the at least one Fresnel radius. In one embodiment, if multiple Fresnel radiuses are determined, the ULS client can configure the IR sensors to scan at the largest radius.

If the drone detects an obstacle, the drone uses the camera devices to capture an image and/or recording of the obstacle (block 530). The drone also determines the amount of penetration of the obstacle into the one or more Fresnel zones at the interval (block 530). At block 535, the drone transmits the Fresnel radius information and any obstruction information (e.g., percentage of obstacle penetration, images/recordings of obstacles, interference information, etc.) for the interval to the ULS survey tool. If, at block 525, the drone does not detect an obstacle, the method proceeds to block 535.

Once the drone transmits information about the LOS path for the last interval, the ULS survey tool at block 540 instructs the drone to travel to the target site (e.g., using the drone controller or UTM) if the drone has not reached the target site. At block 545, the ULS survey tool processes the radio path information obtained from the drone. Advantageously, the techniques herein allow a ULS survey tool to gather accurate real-time information about obstacles that may interfere with a LOS path and/or Fresnel zone(s) between radio sites using a drone.

Figure 6:
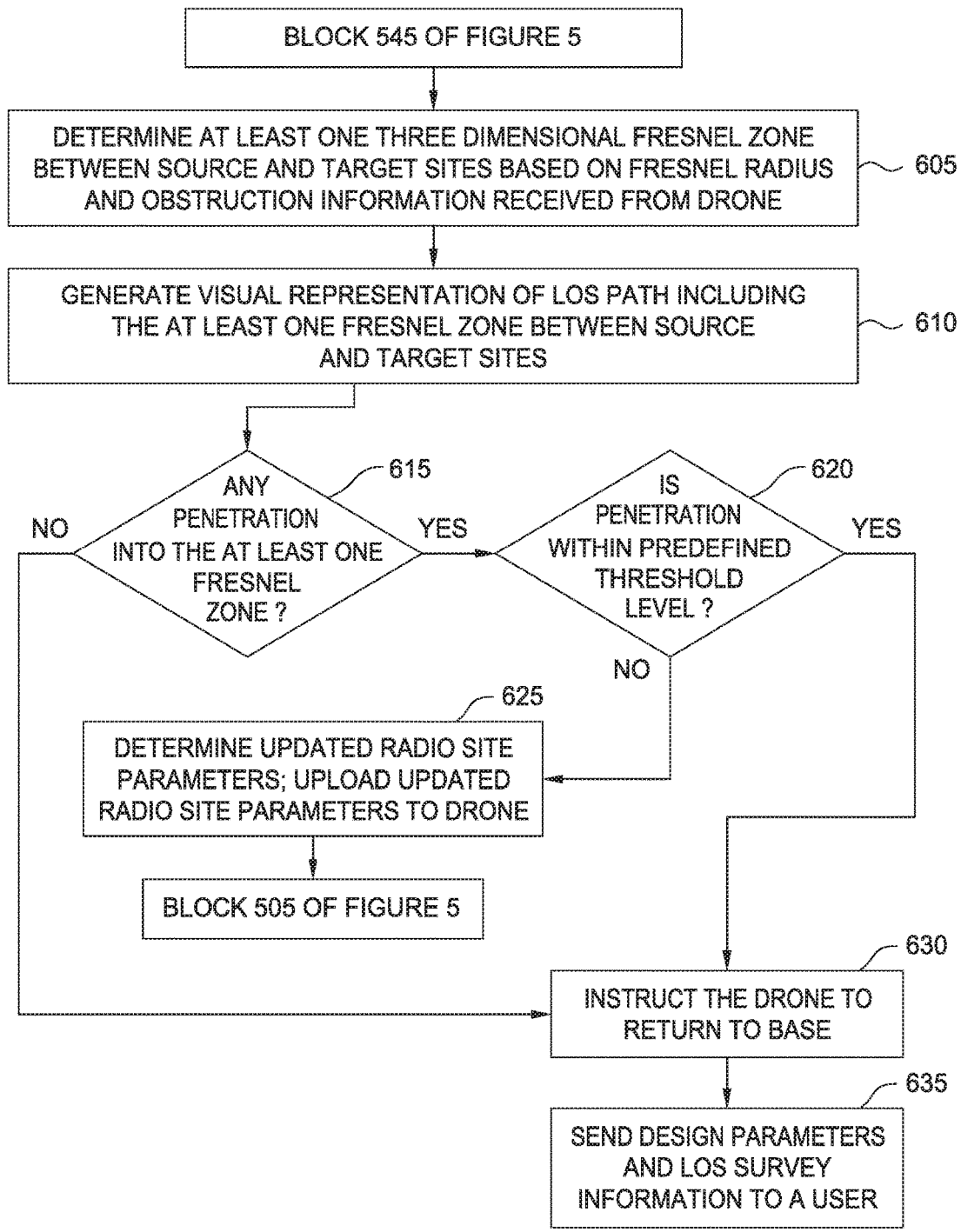
FIG. 6 is a flow chart for validating a LOS survey conducted with a drone, according to one embodiment described herein.

FIG. 6 is a flowchart illustrating a method 600 for validating in real-time a LOS survey conducted with a drone, according to one embodiment described herein. Method 600 begins at block 545 of FIG. 5 when the ULS survey tool processes the information received from the drone. At block 605, the ULS survey tool (in the ULS server) determines at least one three dimensional Fresnel zone between the source and target sites based on the Fresnel radius and obstruction information received from the drone. For example, if for every interval along the path, the ULS survey tool received three different Fresnel radiuses, the ULS survey tool determines three different Fresnel zones based on the radius information. At block 610, the ULS survey tool generates a three dimensional visual representation of the LOS path including the at least one Fresnel zone between the source and target sites (e.g., in a cylindrical coordinate system).

At block 615, the ULS survey tool determines if the LOS path achieved a clear Fresnel zone (e.g., there is no penetration into the at least one Fresnel zone). If so, the ULS survey tool instructs the drone to return to base (block 630). Alternatively, in some embodiments, the ULS survey tool may instruct the drone to conduct another LOS survey of a proposed link between other radio sites. In such a case, the ULS survey tool can configure the drone with a different set of parameters (e.g., coordinates, height, updated terrain information, etc.). At block 635, the ULS survey tool sends the design parameters (e.g., coordinates of proposed sites along with average height above ground, generated visual representation of the LOS path, etc.) to a user for microwave backhaul planning.

On the other hand, if at block 615, the ULS survey tool determines there is penetration into the at least one Fresnel zone, the ULS survey tool determines if the penetration is within a predefined threshold level (or tolerance) (block

620). If so, the method proceeds to block 630. If not, the ULS survey tool determines an updated set of parameters for conducting a LOS survey and uploads the parameters to the drone. In one embodiment, the ULS survey tool can change one or more of the location of the source and/or target site, a height of a proposed antenna at the source and/or target site, a frequency to use for determining Fresnel radius, predefined distance intervals for reporting obstruction and Fresnel radius information, terrain map information, existing physical structure information, and so on. In general, the ULS survey tool can choose to update any configuration parameter after evaluating the previous generated Fresnel zone, and determining the problem with the previous Fresnel zone. For example, the ULS survey tool may determine that the height above either the source or target locations was too low in order to achieve a clear Fresnel zone. In such an example, the ULS survey tool may increase the height of the proposed link and instruct the drone to conduct the LOS survey at the increased height to verify that the Fresnel zone at the different height is acceptable.

Advantageously, in this manner, the ULS survey tool can validate and perform LOS path surveys in real-time for microwave backhaul planning. Moreover, the techniques presented herein can be used to perform system maintenance for an existing LOS wireless communication link (e.g., to determine if the Fresnel zone has been penetrated by obstacles that were not present before establishment of the link). As such, the techniques presented herein (compared to traditional techniques) substantially reduce the amount of time associated with gathering and verifying information about LOS paths and Fresnel zones between potential radio sites.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the ULS survey tool) or related data available in the cloud. For example, the ULS survey tool could execute on a computing system in the cloud and communicate with the drone. In such a case, the ULS survey tool can validate a LOS path survey conducted by the drone and store information obtained from the drone and/or configuration parameters for conducting the LOS survey at a storage location in the cloud. Doing so allows the drone to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   instructing an unmanned aerial vehicle (UAV) to travel a line of sight (LOS) path between a first location and a second location;
   instructing the UAV to determine a Fresnel radius at one or more defined locations along the LOS path between the first location and the second location;
   determining a Fresnel zone between the first location and second location based in part on the determined Fresnel radius for each of the defined locations along the LOS path;
   receiving information regarding one or more obstacles detected, by the UAV, within the Fresnel radius at one or more of the defined locations along the LOS path;
   generating a three dimensional cylindrical visual representation of the LOS path and Fresnel zone based in part on the received information and the determined Fresnel radius for each of the defined locations; and
   evaluating the Fresnel zone to determine if the LOS path can support a LOS wireless communication link.

2. The method of claim 1, wherein the information includes an image of each detected obstacle and an indication of an amount of penetration of each detected obstacle within the Fresnel radius at the respective locations along the LOS path.

3. The method of claim 1, further comprising:
   upon determining the LOS path cannot support the LOS wireless communication link, adjusting parameters of at least one of the first location and the second location; and
   instructing the UAV to travel another LOS path between the first location and the second location according to the adjusted parameters.

4. The method of claim 3, wherein the adjusted parameters comprise at least one of an adjusted height relative to a height for the first location and an adjusted height relative to a height for the second location.

5. The method of claim 3, wherein the determination that the LOS path cannot support the LOS wireless communication link is based on determining that an amount of penetration of an obstacle, detected by the UAV, into the Fresnel zone is above a defined threshold.

6. The method of claim 1, further comprising:
   instructing the UAV to determine at least another Fresnel radius at the one or more defined locations along the LOS path between the first location and the second location; and
   determining at least another Fresnel zone based in part on the at least another Fresnel radius.

7. A computing system, comprising:
   at least one computing processor configured to:
   instruct an unmanned aerial vehicle (UAV) to travel a line of sight (LOS) path between a first location and a second location;
   instruct the UAV to determine a Fresnel radius at one or more defined locations along the LOS path between the first location and the second location;

determine a Fresnel zone between the first location and second location based in part on the determined Fresnel radius for each of the defined locations along the LOS path;

receive information regarding one or more obstacles detected, by the UAV, within the Fresnel radius at one or more of the defined locations along the LOS path;

generate a three dimensional cylindrical visual representation of the LOS path and Fresnel zone based in part on the received information and the determined Fresnel radius for each of the defined locations; and evaluate the Fresnel zone to determine if the LOS path can support a LOS wireless communication link.

8. The computing system of claim 7, wherein the information includes an image of each detected obstacle and an indication of an amount of penetration of each detected obstacle within the Fresnel radius at the respective locations along the LOS path.

9. The computing system of claim 7, wherein the at least one computing processor is configured to:

upon determining the LOS path cannot support the LOS wireless communication link, adjust parameters of at least one of the first location and the second location; and instruct the UAV to travel another LOS path between the first location and the second location according to the adjusted parameters.

10. The computing system of claim 9, wherein the adjusted parameters comprise at least one of an adjusted height relative to a height for the first location and an adjusted height relative to a height for the second location.

11. The computing system of claim 9, wherein the determination that the LOS path cannot support the LOS wireless communication link is based on determining that an amount of penetration of an obstacle, detected by the UAV, into the Fresnel zone is above a defined threshold.

12. The computing system of claim 7, wherein the at least one computing processor is configured to:

instruct the UAV to determine at least another Fresnel radius at the one or more defined locations along the LOS path between the first location and the second location; and determine at least another Fresnel zone based in part on the at least another Fresnel radius.

13. A communication system, comprising:

an unmanned aerial vehicle (UAV); and at least one computing processor configured to:

instruct the UAV to travel a line of sight (LOS) path between a first location and a second location;

instruct the UAV to determine a Fresnel radius at one or more defined locations along the LOS path between the first location and the second location;

determine a Fresnel zone between the first location and second location based in part on the determined Fresnel radius for each of the defined locations along the LOS path;

receive information regarding one or more obstacles detected, by the UAV, within the Fresnel radius at one or more of the defined locations along the LOS path;

generate a three dimensional cylindrical visual representation of the LOS path and Fresnel zone based in part on the received information and the determined Fresnel radius for each of the defined locations; and evaluate the Fresnel zone to determine if the LOS path can support a LOS wireless communication link.

14. The communication system of claim 13, wherein the information includes an image of each detected obstacle and an indication of an amount of penetration of each detected obstacle within the Fresnel radius at the respective locations along the LOS path.

15. The communication system of claim 13, wherein the at least one computing processor is configured to:

upon determining the LOS path cannot support the LOS wireless communication link, adjust parameters of at least one of the first location and the second location; and instruct the UAV to travel another LOS path between the first location and the second location according to the adjusted parameters.

16. The communication system of claim 13, wherein the determination that the LOS path cannot support the LOS wireless communication link is based on determining that an amount of penetration of an obstacle, detected by the UAV, into the Fresnel zone is above a defined threshold.

17. The communication system of claim 13, wherein the at least one computing processor is configured to:

instruct the UAV to determine at least another Fresnel radius at the one or more defined locations along the LOS path between the first location and the second location; and determine at least another Fresnel zone based in part on the at least another Fresnel radius.

18. The communication system of claim 15, wherein the adjusted parameters comprise at least one of an adjusted height relative to a height for the first location and an adjusted height relative to a height for the second location.

* * * * *